(No Model.) 2 Sheets—Sheet 1.

H. J. SPRINGER.
STALK CUTTER.

No. 270,994. Patented Jan. 23, 1883.

Attest:
Fred Lear
Charles Pickles

Inventor:
Henry J. Springer
by C. D. Moody atty (No Model.)  2 Sheets—Sheet 2.

H. J. SPRINGER.
STALK CUTTER.

No. 270,994. Patented Jan. 23, 1883.

Attest:
Fredk Sear
Charles Pickles

Inventor:
Henry J. Springer
by C. D. Moody atty

N. PETERS, Photo-Lithographer, Washington, D. C.

UNITED STATES PATENT OFFICE.

HENRY J. SPRINGER, OF EDWARDSVILLE, ILLINOIS.

STALK-CUTTER.

SPECIFICATION forming part of Letters Patent No. 270,994, dated January 23, 1883.

Application filed February 4, 1882. (No model.)

*To all whom it may concern:*

Be it known that I, HENRY J. SPRINGER, of Edwardsville, Illinois, have made a new and useful Improvement in Stalk-Cutters, of which the following is a full, clear, and exact description, reference being had to the annexed drawings, making part of this specification, in which—

Figure 1:
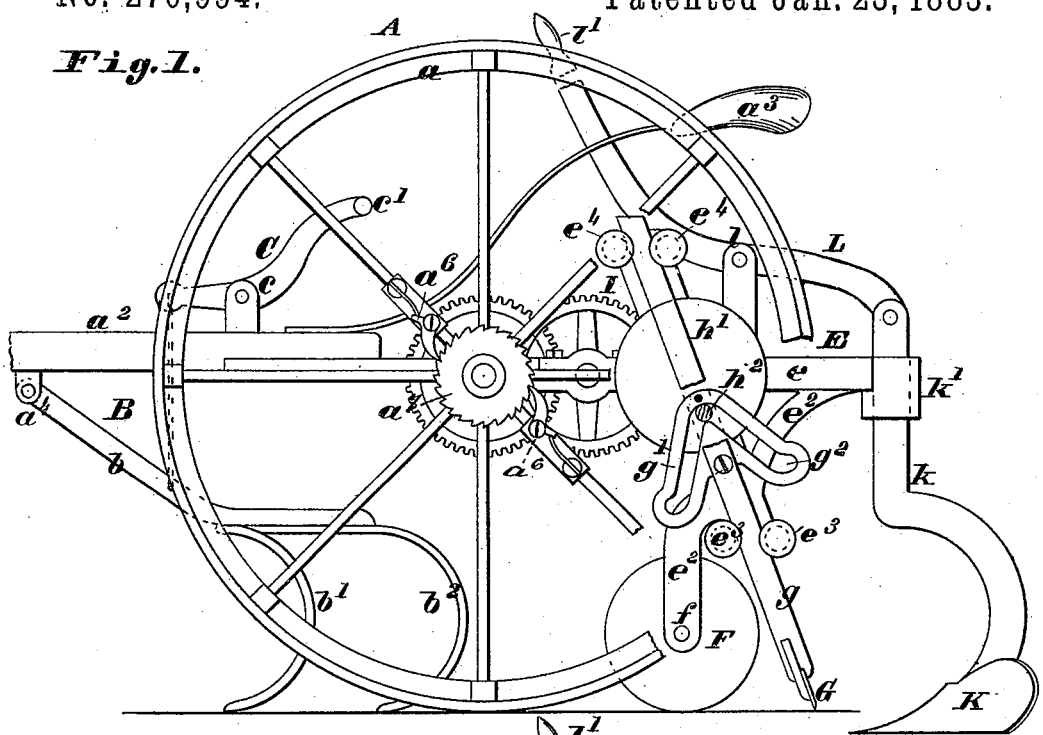
Figure 2:
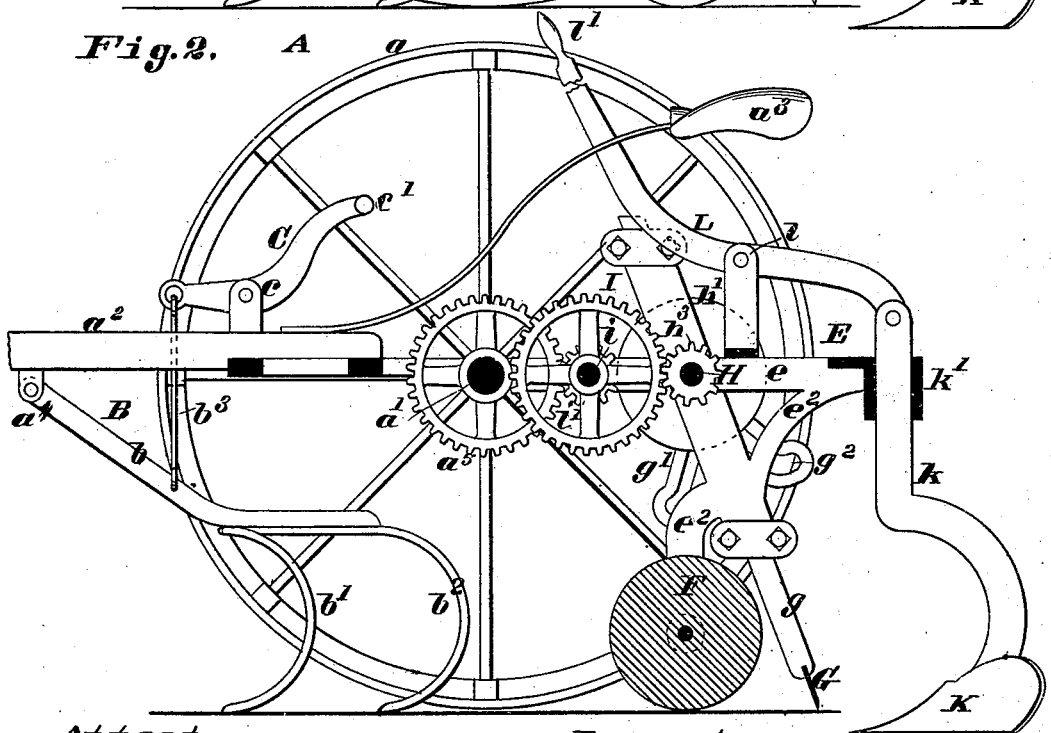
Figure 3:
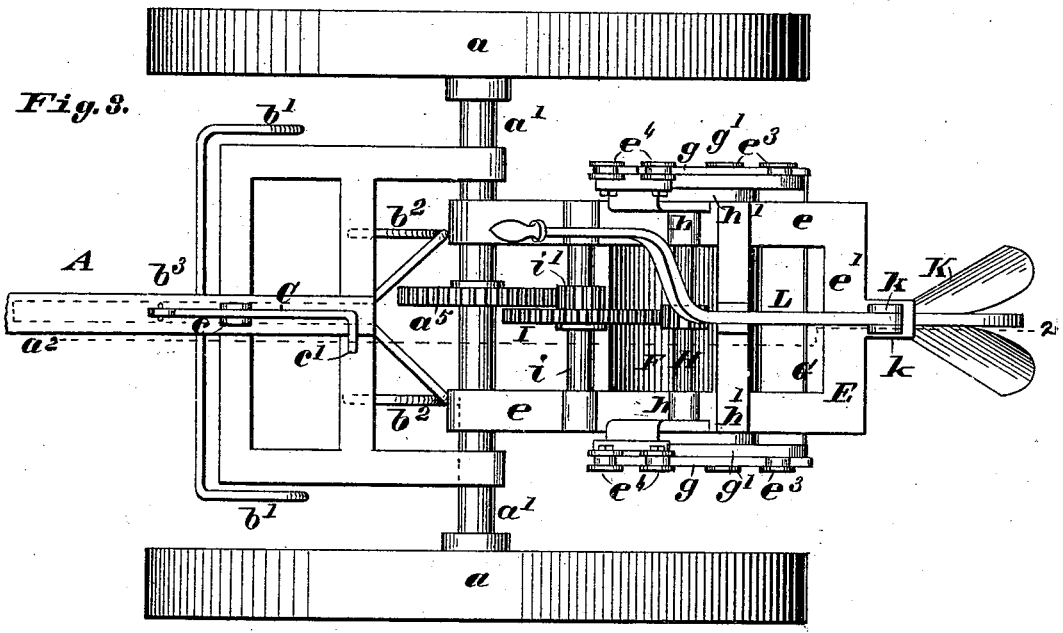
Figure 4:
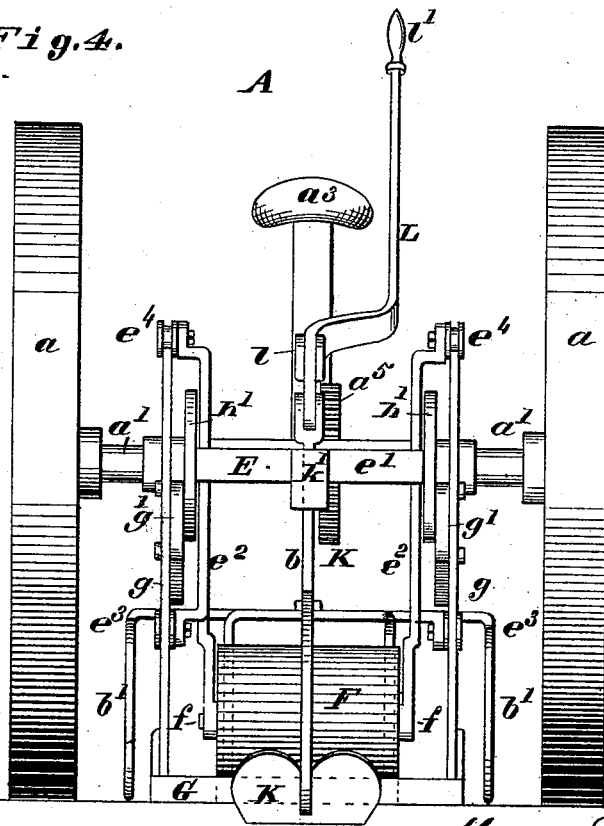

Figure 1 is a side elevation of the improved machine; Fig. 2, a longitudinal vertical section taken on the line 2 2 of Fig. 3; Fig. 3, a plan, and Fig. 4 an end elevation.

The same letters denote the same parts.

Considered generally, the present construction consists of a sulky having in front of the axle a rake for straightening and depressing the stalks in the direction of the movement of the sulky, and in rear of the axle, and hinged thereto, having a frame carrying a roller for holding the stalks down while being cut, a device for cutting the stalks, and a plow or shovel in rear of the cutter for leveling the ridge and partially burying the cut stalks.

The improvement relates mainly to the peculiar means used in effecting the cutting. It also has reference to the raking, rolling, and plowing devices, in combination with the cutting device.

Referring to the drawings, A represents a sulky having the wheels $a\ a$, the axle $a'$, the tongue $a^2$, and the seat $a^3$.

B represents a rake traveling between the sulky-wheels in front of the cutting mechanism, the rake-handle $b$ being hinged or jointed to the tongue $a^2$ at $a^4$, and being furnished with the teeth $b'\ b'\ b^2\ b^2$, arranged the first forward of the latter. A connection, $b^3$, leads from the rake upward to a lever, C, that in turn is jointed to a bearing, $c$, and extending thence backward, and at its rear end furnished with a pedal, $c'$, or suitably constructed to enable the driver to press his foot upon the lever, and thereby lift the rake on the bearing $a^4$ from off the ground and stalks whenever desired.

E represents a frame that carries the rolling, cutting, and plowing devices. The side bars, $e\ e$, at their forward ends, are hinged to or so connected with the axle $a'$ as to turn vertically thereupon, and at or toward their rearward ends suitably connected by a cross-bar, $e'$. Arms or brackets $e^2\ e^2$ depend from the frame, and serve to support or hold in place a roller, F, which turns in bearings $f\ f$ in the arms $e^2\ e^2$, and rides upon the ground or bent stalks, operating to hold the stalks down as they are cut, and also to uphold the rear end of the frame E and the mechanisms therewith connected.

G represents a blade or part suitable for cutting corn, cotton, or similar stalks. It is made to have a reciprocating movement upward and downward in rear of the roller F, the stroke being effected very rapidly, the aim being to strike the blade sharply down onto the stalks, and then, after making the cut, to withdraw it upward again in the quickest practicable time. To this end the following mechanism is adopted: The blade is attached to arms $g\ g$. The arms move up and down in guides or bearings $e^3\ e^4$, which are suitably attached to or connected with the frame E. Slotted plates $g'\ g'$, having slots $g^2\ g^2$ of the inverted-V shape shown, are attached to and made part of the arms $g\ g$. A shaft, H, turning in bearings $h\ h$ in the frame E, is furnished with cranks $h'\ h'$, having the wrist-pins or rollers $h^2\ h^2$, which engage in the slots $g^2\ g^2$. The rotation of the shaft H then not only causes the arms $g\ g$ and blade G to move upward and downward, but so as to cause the movement at and near its downward limit to be effected very promptly. The rotation of the shaft H is accomplished by gearing it to the sulky-axle $a'$, the train of gearing being such as to impart the requisite speed to the shaft H. As shown, the latter is furnished with a pinion, $h^3$. The pinion engages with a gear, I, upon a shaft, $i$, and having a pinion, $i'$. The latter engages with a gear, $a^5$, upon the shaft $a'$.

K represents a plow or shovel attached to the frame E in rear of the blade G, its standard $k$ being held in a bearing, $k'$, upon the frame E, and capable of vertical adjustment therein by means of a lever, L, the lever being jointed to the standard and turning on a fulcrum, $l$, and extending thence forward and terminating in a handle, $l'$. By depressing the handle the plow is lifted.

The operation of the construction is then as follows: The rake B, being let down, acts, as the sulky is drawn forward, to initiate the bending downward of the stalks, and also, in case they have been disarranged, to disentangle and straighten them in the direction of the movement of the machine. The roller F, by riding upon the partially-bent stalks, acts to depress them still more, and sufficiently for the cutting-blade to operate to advantage. The stalks are then cut by the action of the blade G, the roller F serving also, by rolling over the ground, to keep the blade always in the same and in its proper relation to the ground. The plow K then, being suitably vertically adjusted therefor, acts to level the ridge and ground, and to partially cover the cut stalks into the ground, it not being desirable to bury the stalks deeply into the ground. When it is desired to disentangle the rake B from the stalks or to lift it from the ground, it is raised by means of the lever C. The sulky-wheels are kept in gear with the sulky-axle, so as to drive the latter, by any suitable means—as, for instance, the pawls $a^6$, engaging in the ratchet $a^7$. When it is not desired to rotate the sulky-axle, the sulky-wheels are thrown out of engagement therewith. The frame E also can, by turning it upward on the sulky-axle, and which can be done by any suitable means, (not shown,) be lifted sufficiently from the ground for the roller F, blade G, and plow K to entirely clear the ground, enabling the machine to be transported readily. The frame E may be hinged in front of the axle $a'$.

I claim—

1. In a stalk-cutter, the combination of the sulky A and adjustable rake B, having teeth $b'$ $b^2$, as shown and described, with the hinged rear frame, E, having a reciprocating blade, G, as described, and the vertically-adjustable plow K in the rear, substantially as set forth.

2. In a stalk-cutter, as described, the combination of the rear hinged frame, E, having a reciprocating blade, G, the roller F, turning in bearings $ff$ in arms $e^2$, and operating to hold the stalks down and uphold the rear end of E; and the vertically-adjustable plow K, all as described.

3. The combination of the blade G, the arms $g$ $g$, the guides $e^3$ $e^4$, the slotted plates $g'$ $g'$, the frame E, the shaft H, the cranks $h'$ $h'$, and the pins $h^2$ $h^2$, substantially as described.

4. The combination of the frame E, the crank $h'$, the pin $h^2$, the arm $g$, and the slotted plate $g'$, substantially as described.

H. J. SPRINGER.

Witnesses:
WM. F. SPRINGER,
JACOB HANSER.